United States Patent [19]

Reese

Best Available Copy

[11] 4,289,944

[45] Sep. 15, 1981

[54] APPARATUS FOR REHEATING, STORING AND CONVEYING CAST BARS

[76] Inventor: Thurston F. Reese, 4929 S. Meridian Rd., Jackson, Mich. 49204

[21] Appl. No.: 862,117

[22] Filed: Dec. 19, 1977

[51] Int. Cl.$^3$ .......................... H05B 6/06; F27D 3/02; B65G 47/30

[52] U.S. Cl. .............................. 219/10.41; 219/10.71; 219/10.75; 219/7.5; 164/154; 432/239; 432/122; 198/952; 198/443; 198/433; 414/152

[58] Field of Search .................. 219/7.5, 10.43, 10.41, 219/10.67, 10.69, 10.71, 10.73, 10.75, 10.77; 266/114; 164/150, 154; 432/121, 122, 124, 239; 198/774, 461, 443, 614, 433, 952, 857, 572, 575; 414/150, 152, 748

[56] References Cited

U.S. PATENT DOCUMENTS

| | | | |
|---|---|---|---|
| 2,888,125 | 5/1959 | Engelson et al. | 198/461 |
| 2,983,498 | 5/1961 | MacGregor | 432/239 |
| 3,074,117 | 1/1963 | Carpenter et al. | 219/10.43 |
| 3,182,168 | 5/1965 | Cornell | 219/10.69 |
| 3,243,059 | 3/1966 | Kalbe-rkamp | 414/152 |
| 3,272,312 | 9/1966 | Clark et al. | 198/461 |
| 3,417,881 | 12/1968 | Loveless | 414/150 |
| 3,419,698 | 12/1968 | Palermo et al. | 219/10.71 |
| 3,469,052 | 9/1969 | Hatchard | 219/10.71 |
| 3,471,673 | 10/1969 | Frostick | 219/10.69 |
| 3,605,981 | 9/1971 | Danieli | 198/774 |
| 3,610,861 | 10/1971 | Storey | 219/10.69 |
| 3,662,995 | 5/1972 | Armstrong | 219/10.69 |
| 3,715,556 | 2/1973 | Balzer et al. | 219/10.69 |
| 3,743,808 | 7/1973 | Kasper | 219/10.41 |
| 3,748,207 | 7/1973 | Campbell et al. | 156/359 |
| 3,866,740 | 2/1975 | Greathead | 198/461 X |
| 3,868,009 | 2/1975 | Billi et al. | 198/461 |
| 3,871,288 | 3/1975 | White | 414/748 |
| 4,042,227 | 8/1977 | Niehaus et al. | 266/114 |
| 4,115,675 | 9/1978 | Narihara et al. | 219/10.41 |
| 4,117,293 | 9/1976 | Wicker et al. | 219/10.71 |

*Primary Examiner*—Gene Z. Rubinson

*Assistant Examiner*—Philip H. Leung

*Attorney, Agent, or Firm*—Beaman & Beaman

[57] ABSTRACT

The invention relates to a method of reheating, storing and conveying metal bars or rounds cast by continuous casting processes whereby uniform bar temperature is achieved, lengthwise and cross sectionally, prior to rolling, cutting and other secondary operations, and discloses apparatus for practicing the novel process concepts. Cast metal bars having varying heat content throughout their length and cross section have their local heat content restored by heaters at a variable rate proportional to the energy required to produce a substantially uniform temperature throughout the bar length end cross section. The reheated bars are stored in a inventory control and soaking furnace for a duration at least sufficient to permit the energy absorbed by the bars during reheating to uniformly dissipate throughout the bars, and and bars of uniform temperature are released from the furnace at a controlled rate for subsequent processing. The method and apparatus of the invention permits uniformly heated bars or rounds to be released and conveyed at controlled and uniform intervals for secondary operations even though the casting production rate is non-uniform and not synchronized with the secondary bar processing operations.

6 Claims, 9 Drawing Figures

APPARATUS FOR REHEATING, STORING AND CONVEYING CAST BARS

BACKGROUND OF THE INVENTION

The novel concepts relate to methods and apparatus for handling, reheating, storing and conveying bars or rounds, particularly those formed by continuous casting processes.

The basic production of steel includes the steps of melting the raw material, either ore or scrap; casting the melt into the desired configuration such as ingots, slabs, bars or rounds, etc.; metallurgical treatment such as reheating or soaking; fabrication such as rolling or cutting; and cooling. The finished product shipped from the steel mill will be further processed and fabricated into any of the many forms in which the metal is formed such as plate, sheet, wire, tube, rails, structural profiles, etc. The various steps involved will differ in accordance with the particular type of metal being processed and the form desired of the finished mill product. It has long been recognized that high grade metal having high quality integrity and grain structure is the result of carefully controlled casting and rolling techniques conducted at the proper temperatures.

A wide variety of metal or steel products are formed from cast bars or rounds, such bars being cast in cylindrical form having diameters ranging between 4 inches and 14 inches and in a variety of lengths. Such rounds are widely used to form seamless tube, forgings or rod for drawing wire.

Rounds may be economically cast in a continuous process by rotating casters which basically consist of a vertically oriented mold which rotates during casting, the molten metal being poured into the upper end of the caster, and the solidified cast metal leaving the caster lower end. The solidified cast metal is periodically severed to form bars or rounds of determinate length which are conveyed to subsequent treating stations. The rate at which the round is formed by the caster is determined by many variables, such as the metal composition, the diameter or cross sectional configuration of the round, the rate of metal flow into the caster upper end, and other known factors. Also, if the melting furnace capacity is not sufficient to keep the caster operation continuous the caster output will be intermittent between ladle and tundish replenishing.

As the metal flows from the caster it begins to cool and the temperature of any axial increment will be directly related to the time interval since casting. Accordingly, as the caster output is severed into lengths the resultant rounds will have a "cold" end and a "hot" end, the cold end being the forward end of the round with respect to the direction of metal movement as it leaves the caster.

It has long been appreciated that the temperature of steel must be closely regulated during cooling and processing if the optimum metallurgical characteristics are to be achieved. Overheating will "burn" the steel destroying the desired grain structure, while the rolling of steel which is too cool will produce voids, flaking and molecular slippage, and prevent a homogeneous molecular structure. Additionally, the rate of cooling, and the temperature of the steel during rolling directly effects the mallability and hardness, which are critical factors with respect to subsequent fabrication as are spread elongation ratios.

Because the continuously cast round temperature varies throughout its length and cross section the round temperature must be brought to uniformity throughout if optimum processing and metallurgical qualities are to be achieved. The rounds could be introduced into a furnace, and slowly brought to a desired uniform temperature, but such reheating is slow and wasteful as it does not efficiently take advantage of the considerable residual heat within the round resulting from the casting process.

A significant advantage of the rotary continuous casting method of forming steel rounds over prior round forming processes lies in the ability of the caster to operate in a continuous, or substantially continuous, manner wherein a steady output of bars or rounds is achieved. To most efficiently utilize this advantage of the continuous caster the processing of the rounds subsequent to casting should also be continuous, or substantially so, wherein a minimum of equipment is required to process maximum steel tonnage in a given time interval. By minimizing the duration of time between casting and rolling maximum advantage of the residual casting heat within the round can be achieved.

To the present, continuous casting processes and installations have not utilized the advantages derived from continuous casting to the utmost because of several factors. First, because continuous casting inherently produces a round having a variable temperature throughout its length and cross section reheating is necessary in order to achieve a high quality product, yet those reheating devices now being utilized do not efficiently take advantage of the round residual casting heat resulting in excessive fuel costs during the reheating stage. Secondly, as the output of the continuous caster will be considerably slower than the rate of round movement during rolling a single rolling mill is capable of handling the output of several continuous casters and yet it is not possible to accurately synchronize the output of several casters with the output of the reheating means and the rolling mill. Accordingly, in previous installations excessive time intervals would result between the rolling of sequential rounds, or excessive time durations existed between casting and reheating and known conveying and reheating structure is unable to most efficiently coordinate caster output with reheating and rolling cycles to efficiently coordinate capital expenditure with the mill capacity.

SUMMARY OF THE INVENTION

It is an object of the invention to provide a method and apparatus for reheating, storing and soaking, and conveying metal bars or rounds initially having a temperature differential throughout their length and cross section, such as results from continuous casting processes, wherein a uniform temperature is produced within the rounds in an efficient manner utilizing a minimum of energy.

An additional object of the invention is to provide a method and apparatus for producing continuous cast rounds wherein a variable energy content is introduced into rounds shortly after casting at a location and rate proportional to the heat loss subsequent to casting whereby the energy content within a round after casting and reheating is substantially equal throughout its length resulting in a substantially uniform axial and cross sectional temperature.

Yet another object of the invention is to provide a method and process for reheating continuously cast rounds shortly after casting wherein the residual cast heat is efficiently utilized to minimize supplemental energy required to bring the round to a uniform temperature throughout its length.

Another object of the invention is to provide apparatus for conveying continually cast rounds through induction heaters wherein the rate of round axial displacement varies in accordance with the energy content to be transmitted to the round within the heaters.

A further object of the invention is to provide a method and apparatus for providing a uniform output of uniformly heated rounds for rolling purposes wherein the supply of rounds from the continuous casters is intermittent and non-uniform.

Yet another object of the invention is to provide a method and process in a conveying system for continuously cast bars or rounds wherein the supply of rounds to the conveyor system is intermittent and non-uniform, while the output to the conveyor system is uniform and the interval between consecutive rounds may be accurately determined and regulated.

Another object of the invention is to provide a soaking furnace for receiving continuously cast rounds wherein the furnace is capable of storing a plurality of rounds and supplying the rounds to dispensing means through a gravity flow arrangement.

An additional object of the invention is to provide a dispensing means for soaking furnace wherein the dispensing means comprises a plurality of levers pivotal between retracted, lower and elevated positions wherein elevator arms, in the retracted position, are removed from the furnace heated space, and in the lower position are disposed below those rounds ready to be lifted in the elevated position to a furnace dispensing conveyor.

In the practice of the invention the conveyor system for handling continuously cast bars or rounds includes a furnace input portion which receives the rounds from the caster, and on which the rounds are reheated by electric induction means prior to being introduced into the soaking and storage furnace. The conveyor system includes a furnace output portion receiving the uniformly heated rounds from the furnace wherein the rounds may then be transferred to de-scaling, rolling, cutting and cooling apparatus.

Pre-heating is achieved by electric high-frequency induction heaters through which the rounds are received shortly after being cast. The roller conveyors employed to axially translate the rounds through the heaters are electrically driven in selective group and individual phases whereby the rate of movement of the rounds through the heaters may be accurately regulated to vary the energy input and heat content of the heaters into the rounds passing therethrough. The pre-heated rounds, now containing an energy or heat content substantially uniform throughout their length, are received within a soaking and storing furnace for a sufficient duration to permit the heat content of the rounds to permeate through the rounds to achieve uniformity without heat loss. Within the furnace, the rounds are deposited upon inclined skids wherein the rounds are stored in parallel engagement with each other and will roll toward the lowermost portion of the skids. An elevator at the skid lower portion selectively raises and deposits the lowermost round upon a dispensing conveyor and the uniformly heated round is then conveyed to a de-scaler, rolling mill, cut off saw, and cooling bed.

The storage of the rounds within the furnace is sufficient to act as an inventory control for the conveyor system whereby the rolls may be dispensed from the furnace at a uniform rate even though the rolls may be fed into the furnace from the pre-heater conveyor system at a non-uniform rate, and thus the furnace functions as an inventory storage and time interval control as well as permitting the round to achieve a uniform predetermined temperature.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
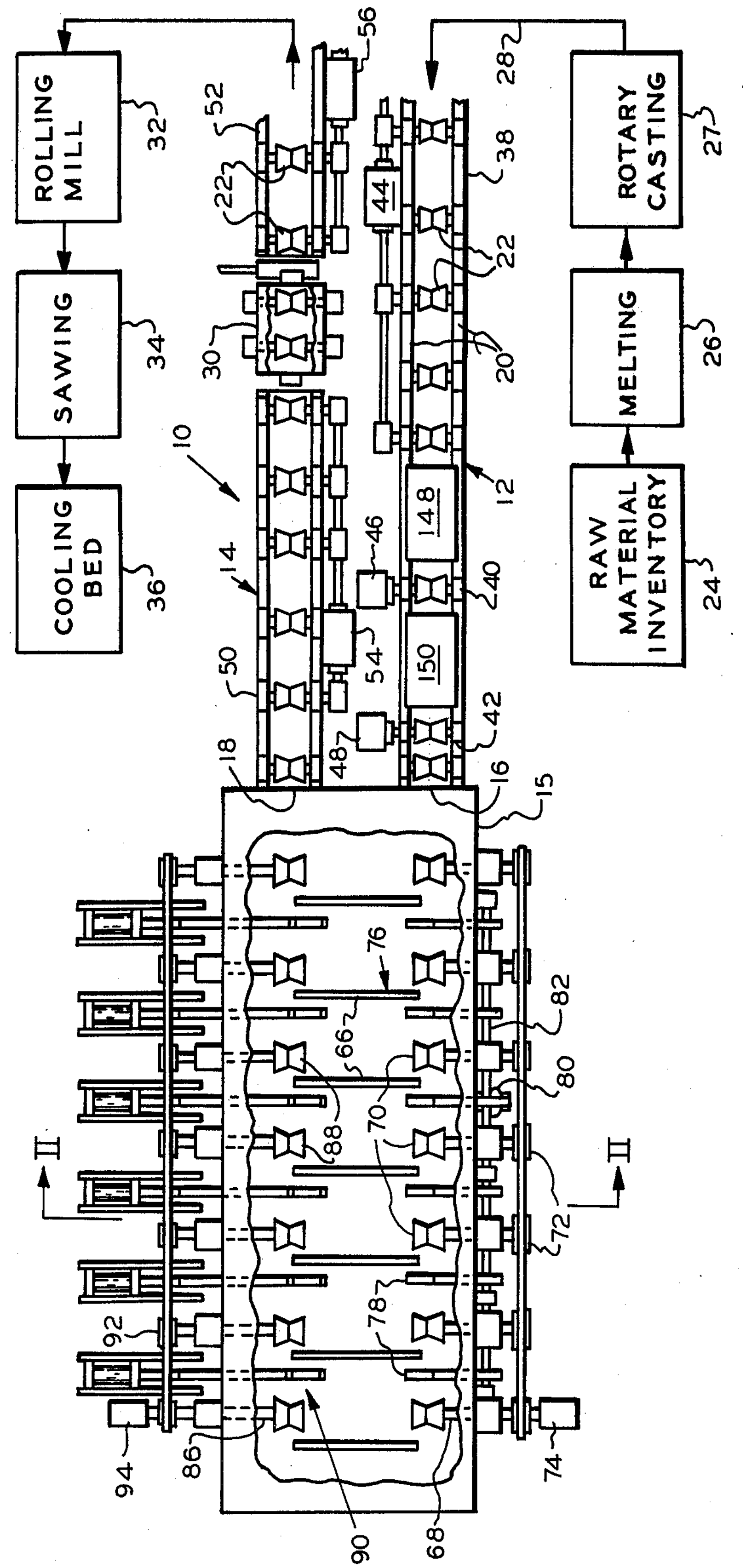
FIG. 1 is a top plan view of a conveyor, heater and furnace system in accord with the concepts of the invention, a portion of the furnace being broken away.

The overall relationship of the structure required to practice the inventive concepts will be appreciated from FIG. 1. The illustrated apparatus includes a conveyor system generally indicated at 10 consisting of a furnace input portion 12, and a furnace output portion 14. The furnace is generally indicated at 15 and includes an inlet at 16 in alignment with the conveyor portion 12, and an outlet at 18 in alignment with the conveyor portion 14.

The conveyors are arranged as tables and each includes spaced side rails 20 upon which V-shaped rollers 22 are rotatably mounted for receiving the continuously cast rounds.

As schematically illustrated in FIG. 1, the conveyor system 10 and furnace 15 is incorporated into a steel producing sequence of operations. The raw material inventory 24 may consist of scrap metal or iron ore, and often includes a combination of both. The raw material is charged into a melting furnace 26 of conventional type. In the installation in which the invention is practiced, melting is accomplished in an electric arc furnace, and the raw material being melted is scrap metal. The melted steel is transferred by ladle to a tundish which supplies a plurality of rotary centrifugal casters which are vertically oriented whereby the cast solidified metal flows from the caster lower end. From the rotary casters, the discharge thereof is cut into bars or rounds, such as of approximately fifteen foot lengths, and the rounds are usually in the form of cylinders having a diameter from 4 to 14 inches. The particular size of the rounds is determined by the particular manner in which the rolled rounds will be used, and the caster is capable of handling a variety of diameters within its designed parameters by changing the mold. Conveyors 28, not illustrated, transfer the rounds from the rotary casting apparatus to the conveyor portion 12. As a significant delay exists between the time an axial unit length of a round is cast and arrives at the conveyor portion 12 the "forward" end of the round will be from 100° F. to 600° F. cooler than the "rear" of the round depending upon the rate of casting, diameter of the round, temperature of the surrounding air, rate of transporting from casting to conveyor 12, scale formation, etc.

After the round has been uniformly heated and discharged from furnace 15 upon conveyor portion 14, the round is de-scaled by the hydraulic de-scaler 30 and is conveyed to a rolling mill 32 for shaping and sizing, and the resultant rolled bars are then sawn into the desired length at 34 and transported by conveyor to a cooling bed 36 from which the bars are discharged for shipment.

The conveyor input portion 12 consists of three separate tables 38, 40 and 42 respectively, each table being independently driven by an electric motor drive. In FIG. 1, three of the rollers of table 38 are mechanically connected to the motor 44 for rotation thereby, while two of the rollers 22 constitute idlers. The roller constituting table 40 is driven by electric motor 46, while at least one of the rollers of the table 42 is driven by electric motor 48.

Conveyor output portion 14 includes tables 50 and 52, and four of the rollers of table 50 are driven by electric motor 54, while at least two of the rollers of table 52 are driven by electric motor 56. The de-scaler 30 also includes rollers for supporting the rounds as they pass therethrough.

Figure 2:
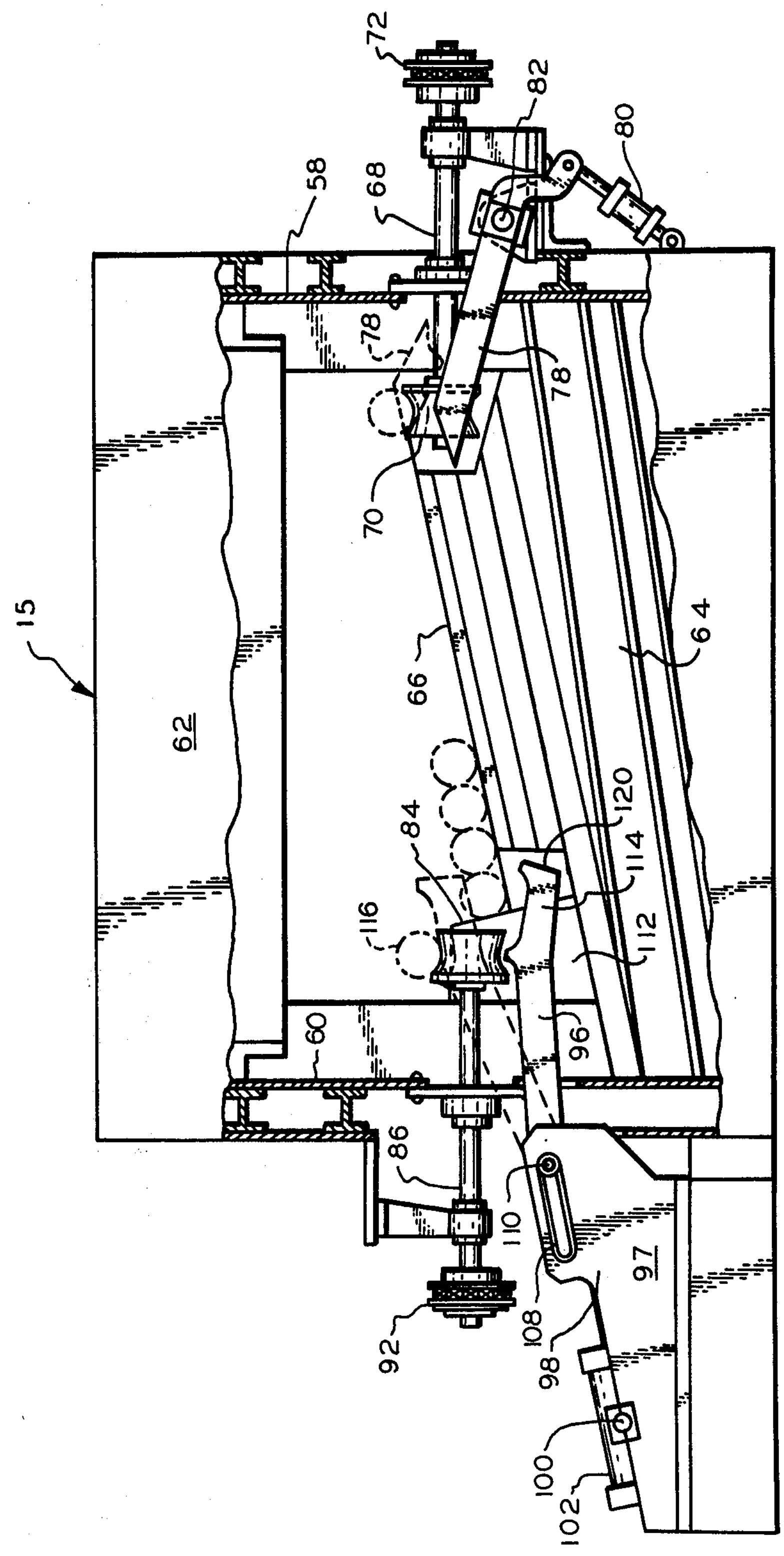
FIG. 2 is an elevational sectional view taken through the furnace along Section II—II of FIG. 1.

The furnace 15 is of a rectangular configuration having insulated sidewalls 58 and 60, insulated end walls, and insulated top panel 62, and a thermally insulated floor 64. The floor 64 is inclined from side wall to side wall, as it will be appreciated from FIG. 2, and a plurality of elongated skids 66 are disposed on the floor transversely disposed to the furnace length. The end wall adjacent conveyor 10 is provided with openings defining inlet 16 and outlet 18.

A plurality of shafts 68 are rotatably mounted in the furnace wall 58 having an inner end extending into the furnace upon which a round receiving conveyor roller 70 is mounted. These shafts include an outer end upon which a driven means, such as a chain sprocket 72 is mounted whereby the shafts may be rotated by a chain and electric motor 74, FIG. 1. This structure constitutes conveyor table 76. Also, a plurality of pivotally mounted conveyor unloading arms 78 are mounted upon the exterior of the furnace wall 58 for simultaneous operation by expansible motor 80. The arms 78 are each affixed to a shaft 82 which is angularly oscillated by the expansible motor 80, and as will be appreciated from FIG. 1, the arms are located intermediate the rollers 70 and are provided with an oblique upper surface which engages the underside of rounds located upon the rollers 70 for lifting the rollers therefrom so that the round will freely roll onto the skids 66. The inclination of the skids 66 causes the rounds deposited thereon to roll to the lower most portion, i.e., to the left as viewed in FIG. 2, and the interior of the furnace includes abutment structure 84 against which the rounds engage to limit their lowermost position.

A plurality of shafts 86 rotatably mounted in furnace wall 60 support conveyor rollers 88 which define the furnace conveyor table 90. The outer ends of the shafts include chain sprockets 92 which cooperate with a drive chain driven by electric motor 94.

The round located at the lowermost portion of the skids 66 is elevated to the rollers 88 at the desired time to permit the round to be discharged from the furnace. Such elevation is produced by a plurality of pivotally mounted elevator arms 96 positionable between retracted, lower and elevated positions.

The elevator arm supporting structure includes a plurality of base brackets 97 mounted exteriorly on the furnace which includes a pair of spaced vertically extending side walls 98. The brackets 97, at their lower position, includes a pivot 100 which pivotally supports an expansible motor 102 at its midsection and the motor includes a piston rod 104 having a pivot pin 106 defined at its outer end. The bracket side walls 98 each include an elongated slot 108 disposed in a direction extending toward the furnace, and the arms 96 each include a pivot pin 110 extending therethrough slidably located within the slots. Thus, the arm pivot pin 110 is capable of a lost motion movement within the slots 108. The arm 96 also includes a downwardly extending portion to which the piston rod pivot 106 is affixed, and it will be appreciated that the pivot 106 is located significantly below the arm pivot 110.

Figure 3:
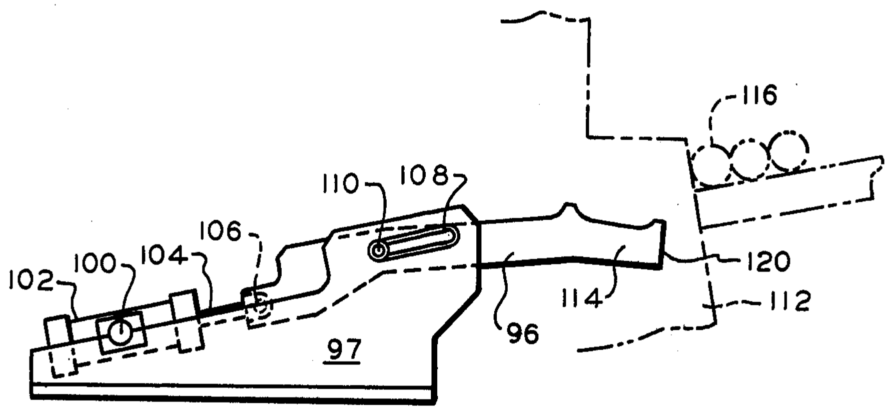
FIG. 3 is an elevational detail view of a furnace elevating arm illustrating the arm in the retracted position.

When the piston rod 104 is retracted, as shown in FIG. 3, the arm 96 will be drawn to the left end of the slots 108 drawing the arm to the illustrated position. Each arm is retracted into a slot 112 defined in the furnace intermediate the rollers 88, and in this retracted position the arm inner end 114 is substantially located out of the heated portion of the furnace protecting the arm end from the furnace high temperatures.

Figure 4:
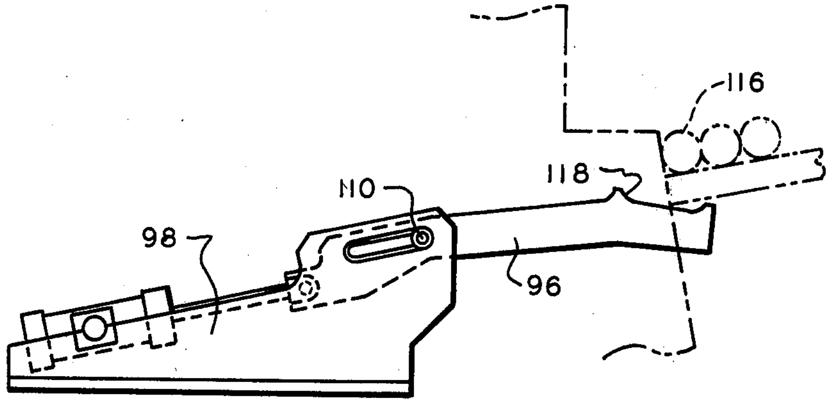
FIG. 4 is a view similar to FIG. 3 illustrating the arm in the lower position.

When it is desired to elevate the lowermost round on skids 66 to the rollers 88 the piston rod is extended which will move the pivot 110 to the right end of the slot 108, FIG. 4. This motion takes place without any angular pivoting of the arm occuring, and upon the pivot reaching the right end of the slot the arm inner end 114 will be located below the round 116 engaging abutment 84 as shown in FIG. 4. Continued extension of the piston rod 104 will pivot the arm 96 upwardly, FIG. 5, due to the fast that the pivot 106 is disposed below the pivot 110, and this action will cause the arm inner end to engage and lift the round 116, and deposit the round upon the rollers 88 shown in FIG. 5. The arm is contoured as illustrated to facilitate handling of the supported round, and includes a rounded abutment surface 118 which will terminate movement of the round as it rolls toward the rollers 88 during elevating.

Figure 5:
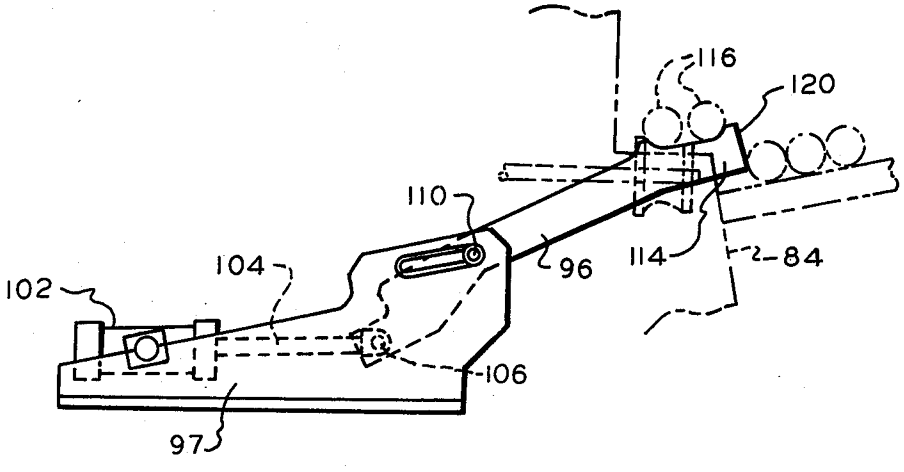
FIG. 5 is a view similar to FIG. 3 illustrating the arm in the fully elevated position.

As will be appreciated from FIG. 5, the vertical dimension of the arm end 114 is such that the arm end surface 120 will function as an abutment against which the lowermost round will engage during lifting of a round. If a number of rounds are located upon the skids 66 gravitational forces will impose a significant pressure against the arm surfaces 120, and accordingly, when the piston rod 104 is retracted the initial angular orientation of the arms 96 may be substantially that shown in FIG. 5 until the arm surface 120 has retracted to a location slightly "behind" the abutment 84. At such time the weight of the arm will cause the arm to pivot to the angular relationship of FIGS. 3 and 4 and as the piston rod is retracted the pin 110 will slide within slots 108 to the retracted position of FIG. 3.

Preferably, the operation of the expansible motors 102, and arms 96 is controlled by an operator, although it is possible to permit the entire system to be automatically regulated. Thus, it is possible for the operator, when the furnace is initially being charged, to pivot the arms 96 to the position of FIG. 5 while several rounds are deposited upon the skids 66 wherein the ends of the arms function as an abutment to engage the rounds as they roll down the skids, and function as a shock absorber against the round movement. The pressure within the expansible motors 102 will produce a shock absorbing function and prevent undue impact upon the abutments 84 when the first round is being deposited upon the skids. It will also be appreciated that the use of the slots 108 prevents binding during lowering of the arms if a round should be located underneath the arm, and the illustrated round elevating structure has proven to be troublefree even in the hostile environment of the furnace 15.

The distance that the arm ends 114 extend beyond the abutment surface 84 will vary depending upon the diameter of the rounds being handled as the extension of the arm surface 120 past abutment 84 should be no greater than the round diameter. The positioning of the arms in this regard can accurately be controlled by the use of abutments located at the right end, FIG. 2, of the slots 108, and these abutments can take the form of blocks placed at the slot end, or a collar can be employed on the pivot pin 110 which engages the end of the slot, and various sizes of collars can be used depending on the diameter of the round being handled.

In operation, the cast rounds are sequentially deposited upon the conveyor table 38, and depending upon the rate of output of the casters, the spacing between the rounds will be indeterminate, and can be somewhat controlled by the operation of the conveying mechanism 28 between the casting station and the table.

Figure 6:
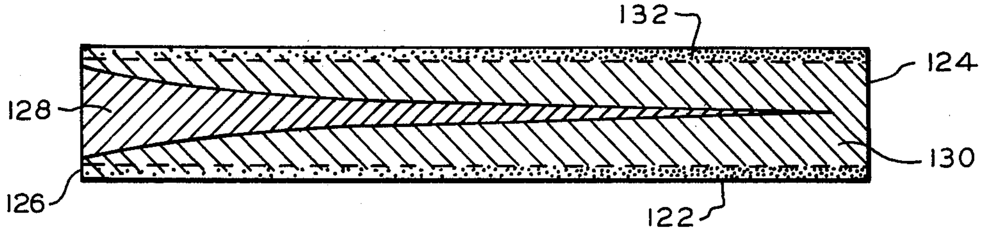
FIG. 6 is a graphical representation of a continuously cast bar or round illustrating the heat dispersant immediately after pre-heating.

The rounds 122, when deposited upon the table 38, will not be of a uniform temperature from the forward end 124, FIG. 6, to the rear end 126 since the end 124 was cast several minutes before the end 126. Of course, cooling of the round begins as soon as the round leaves the caster mold, and graphically FIG. 6 represents the heat distribution within the round when placed upon the conveyor table 38. A central conical core 128 represents the portion of the round metal which is at a temperature only slightly lower than the casting temperature, and this portion of the round is at a excessive heat condition with respect to the desired temperature for rolling and cutting. The portion 130 of the round represents that portion of the steel which has cooled to a temperature lower than that desired for rolling, and the dotted lines 132 represent the depth of absorbed energy after the round has passed through the induction heaters.

The round 122 placed upon conveyor portion 12 passes through the induction heaters at a variable rate, as later described, whereby the energy content within the round upon being received within the furnace is substantially uniform throughout the round's length. At this time, the energy or heat content within the round is the sum of the heat energy residual from the casting process and the energy induced into the round upon passing through the induction heaters. Prior to passing through the induction heaters the residual heat energy in the round was unevenly distributed axially and cross sectionally as will be appreciated from FIG. 6, and due to the variable rate of translation of the round through the induction heaters the energy induced in the round adjacent the end 124 is greater than that at adjacent end 126 to substantially equalize the axial dispersement of energy or heat content within the round upon arriving within the furnace 15.

Upon the round 122 being received upon the rollers 70 of conveyor table 76 sensing apparatus actuates expansible motor 80 to pivot arms 78 and lift the round from the rollers 70 so that the same may roll upon the skids 66. The round will roll down the skids until it engages the previous round, or if the furnace has been emptied, the round will either engage the abutment surface 84, or the end surface 120 of arms 96 if the arms have been raised to absorb the shock of the round's decent.

Heat energy is introduced into the furnace 15, such as by burning gases. The purpose of the furnace 15 is not to add heat to the rounds contained therein, but rather prevent the loss of the heat energy within the rounds upon being received within the furnace, and the heat being introduced into the furnace by fuel counteracts the usual furnace temperature losses.

It is important that the rounds be stored within the furnace long enough to permit the energy within the rounds to equally disperse throughout the mass of the rounds. Thus, as the induction heaters will unevenly heat the rounds from end to end, and as the induction heaters will only initially heat that portion of the round adjacent it's surface, it will be appreciated that the round initially transferred to the furnace will be of variable temperature throughout its length and cross section. However, while in the furnace the energy and heat content of the round will uniformly disperse therethrough within a few minutes, and by the time a round is ready to leave the furnace it will be of the desired uniform temperature.

As described above, the rounds are removed from the furnace by the operation of the elevator arms 96, and in most installations, the operation of the arms 96 will be under operator control. Thus, the uniformly heated rounds can be lifted from the lower portion of the skids 66 to the conveyor table 90 at uniform intervals for discharge from the furnace and transported through the de-scaler 30 to the rolling mill 32, sawed to desired length, and cooled.

As the production of the casters is intermittent, and the casting production rate differs from the rolling and sawing rate, the frequency of the rounds entering the furnace will differ from the time interval that the rounds are dispensed therefrom. For instance, several rounds may be quickly received from the casters and deposited within the furnace at a rate faster than the rounds are dispensed therefrom. However, the furnace has sufficient storing capacity to store a number of rounds to accomodate such differentials in receiving and dispensing rates, and thus the storing ability of the furnace also functions as a conveyor control or inventory regulating apparatus within the conveyor system.

In the disclosed embodiment a furnace gravity feed storage for the rounds is disclosed, and this type of handling of the rounds within the furnace suffices well for relatively low capacity systems. However, in a higher capacity system wherein a larger furnace would be employed the use of inclined skids would not be practical wherein a great number of rounds are to be stored, and other round handling devices may be used within the furnace to achieve the desired storage time. For instance, a walking beam type of arrangement could be used within the furnace for handling greater numbers of rounds.

Figure 7:
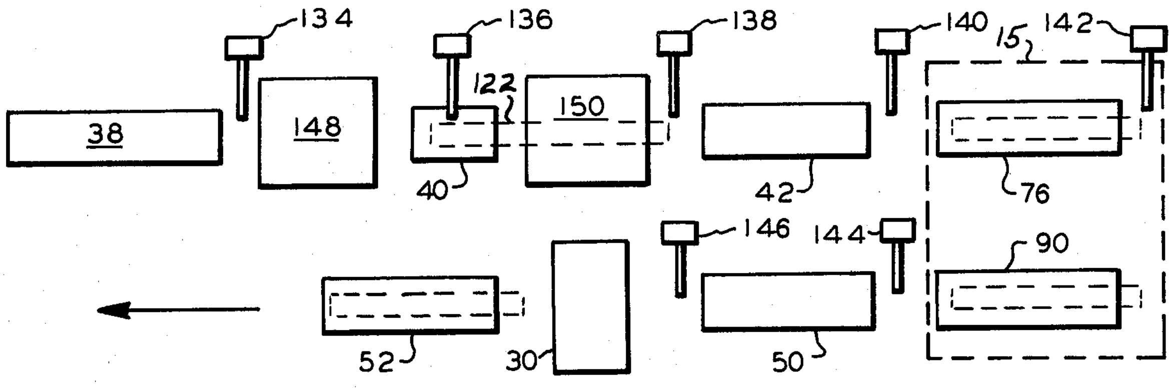
FIGS. 7 and 8 are plan schematic views of the apparatus of the invention illustrating the location of rounds at particular sequences of operation wherein the forward end of the round constitutes the cool end.
Figure 8:
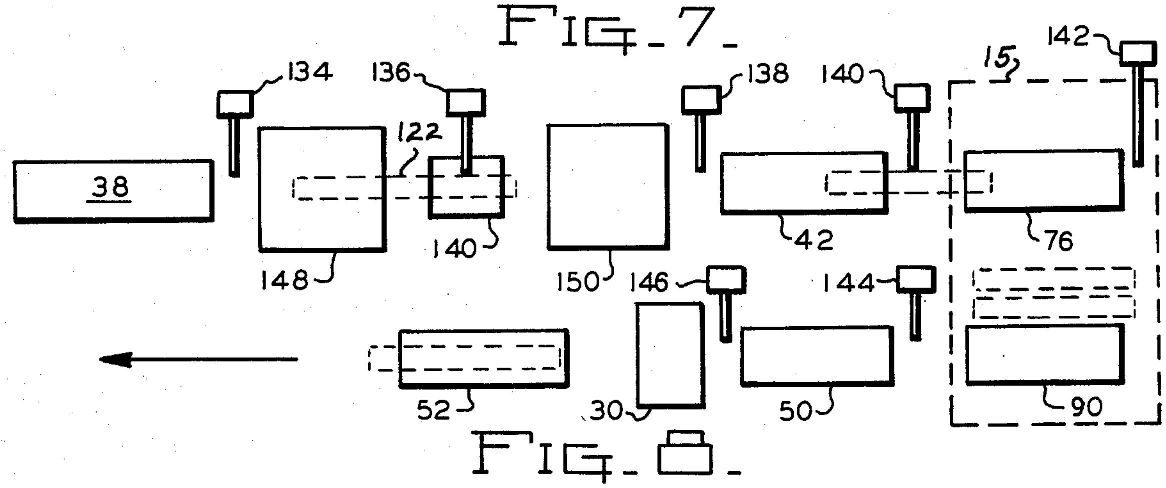
Figure 9:
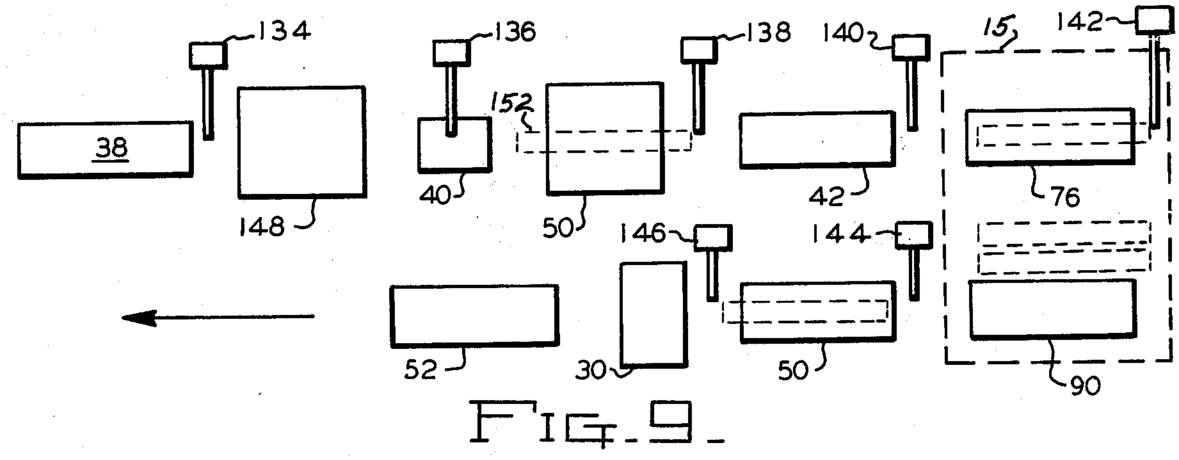
FIG. 9 is a view similar to FIGS. 7 and 8, and illustrating a sequence of conveyor system operation wherein the forward end of the round constitutes the high temperature end.

The operation of the conveyor system in order to produce substantially equal energy content in the rounds upon being introduced into the furnace is schematically illustrated in FIGS. 7 through 9. In FIGS. 7 and 8 an arrangement is shown wherein the round cold end 124 constitutes the forward end of the round with respect to its axial movement. The conveyor tables in these figures are identified by those reference numerals previously employed, and a plurality of bar sensing devices are represented at 134, 136, 138, 140, 142, 144 and 146. These bar sensing devices may be in the form of switches having feelers to sense the presence of the bar, or may be photoelectric devices, or other known equivalent apparatus, capable of sensing the presence or absence of a bar at the location of the sensing means.

Operation of the conveyor system is as follows:

A bar 122 placed upon the table 38 with its cold end to the right, constituting the forward end, will move toward sensor 134 placed between table 38 and induction heater 148. At this time the rollers 22 of table 38 will be operating under the influence of motor 44 at normal or base speed to translate the bar toward the sensor 134, and sensor 134 will detect the round front end. If a preselected time interval has elapsed since the preceding bar no action will occur and the bar will enter induction heater 148. If the preselected time interval has not elapsed since the passage of the last round the sensing of the bar by sensor 134 will stop table 38 and only permit restarting when the desired time interval has passed. At this time tables 38, 40, 42 and 76 will all be operating at the base speed, e.i., their normal operating speed.

The round 122 will proceed into the induction heater 148 at base speed and upon passing through the heater the bar front end will be detected by sensor 136. No action will take place at this time. The bar will proceed through the second induction heater 150 for sensing by sensor 138, and at this time control is switched from base speed to a ramp motor speed control which will control the speed of the motors operating tables 38, 40, 42 and 76. This ramp motor speed, the design of which may be of any conventional nature, will accelerate the rate of operation of the conveyor motors causing the round to move at a faster rate through the heaters thereby decreasing the energy or heat content induced in axial increments of the round as energy transfer will be proportional to the velocity of round movement. Upon the front of the bar reaching sensor 140, which is at the end of table 42, and prior to conveyor table 76 within the furnace 15, if the rear end of the bar has not cleared sensor 134 no action is taken. However, if the rear of the bar has passed sensor 134 the motor of table 38 will revert to base speed and the time interval initiated. Upon the rear of the bar passing sensor 136, the motor 46 of table 40 will switch from ramp speed control to base speed. Upon the rear of the bar clearing sensor 138 the motors of tables 42 and 76 holds at its present speed, and the ramp motor control resets and is available for control of the next bar. When the back of the round clears sensor 140, table 42 reverts to the base speed of tables 38 and 40.

Sensor 142 is located within the furnace at the forward end of conveyor table 76, and upon the front end of the round arriving at sensor 142 table 76 will stop and the arms 78 will be actuated to lift the round from the rollers 70 and permit the round to roll upon the furnace skids 66. At the end of the lift-off stroke of the arms 78 conveyor table 76 is restarted automatically and reverts to the base speed of conveyor tables 38, 40 and 42.

Conveyor tables 90 and 50 operate as one unit, and rollers of these tables usually operate two speeds, either a creep speed which slowly rotates the rollers to prevent them from being overheated at a localized portion, and the second speed is at a greater velocity suitable for conveying the round at a de-scaling speed as its passes through de-scaler 30.

As the round is leaving table 90 at the slow creep speed the sensor 144 will be actuated to switch tables 90, 50 and 52 to the higher de-scaling speed, and upon sensor 146 sensing the presence of the round the de-scaler is actuated and a time delay device shuts off the de-scaler a few seconds later, after de-scaling has been accomplished. The time delay also switches tables 50 and 52 to the creep speed. After the end of the round passes sensor 144 table 90 is returned to creep speed and the system is ready for recycling.

In FIG. 7, an arrangement is shown where a round forward end 124 is being sensed by sensor 138, and also, the furnace sensor 142 is sensing the presence of a round upon conveyor table 76. In FIG. 8 a round is shown in the process of passing through heater 148, and being received within the furnace 15, and a round has passed through the de-scaler 30.

In FIG. 9 an arrangement is shown wherein the hot end of a round constitutes the forward end of the round, and the disclosed apparatus is identical to that described with respect to FIGS. 7 and 8. The basic logic employed in this situation is identical to that previously described in most cases, but some modifications are necessary. With respect to FIG. 9, the round 152 on table 38 approaches sensor 134 at base speed, and when sensor 134 detects the presence of the forward end no action takes place if a sufficient time interval has lapsed since the passing of the last bar. If not, the time delay will stop conveyor table 38 until the time interval has passed and then table 38 is restarted at base speed. Conveyor tables 40, 42 and 76 operate at the same speed as conveyor table 38, except when the time delay stops conveyor table 38. When the front of the bar arrives at sensor 136 no action takes place.

Upon the front of the bar arriving at sensor 138 the control of conveyor table 38, 40, 42 and 76 shifts to ramp control, and in this case the ramp control is used to slow the speed of the conveyor motors and bar movement, rather than accelerate the bar movement as is the case in FIGS. 7 and 8 where by the cold end of the bar constitutes the lead end. Upon the bar arriving at sensor 140 no action takes place unless the back of the bar has cleared sensor 138, and in such case then tables 42 and 76 revert to base speed and the ramp control is reset and available for the next round. When the front of the bar arrives at sensor 142 the rolls on table 76 are stopped, the bar is removed from the rolls to the furnace skids and the rolls of conveyor table 76 restarted at the speed of table 42.

When the rear of the bar clears sensor 134, conveyor table 38 is returned to base speed and the time delay is actuated. If the next bar arrives at sensor 134 before the time relay has passed then table 38 will be stopped and restarted only after passage of the desired time interval.

When the back of the round clears sensor 136 table 40 is switched to the same control as table 38 and when the back of the bar clears sensor 138 the ramp is reset and available for the next sequential control. When the back of the bar clears the sensor 140 conveyor table 42 is actuated to the same control as tables 38 and 40, as previously described, and the removal of the bar from conveyor table 76 restores table 76 to the same control as table 42.

With respect to FIG. 9, the operation of the furnace discharge, and conveyor tables 90, 50 and 52, and the de-scaler, is as described above with respect to FIGS. 7 and 8.

The induction heaters 148 and 150 are preferably of the electrical type, although flame heaters could be used, since their purpose is to rapidly impart heat energy and heat content to the rounds as they pass therethrough. Prior to heating, the heat content of the bar may vary from 10 to 100 Btu's per pound over the bar length, and it will be appreciated that the heaters must be capable of imparting relatively high energy into the round in a short length of time. In rounds having diameters from four to seven inches electric induction heaters operating at 1000 CPS puts 80% to 90% of the induced heat in the outer one-inch of the rounds, and with bars larger than eight inches a lower frequency, such as 180 or 360 CPS will be used to deepen the energy and heat penetration.

From the above description it will be appreciated that a system has been provided which permits the continuous processing of continuously cast bars or rounds, and it is appreciated that various modifications may be apparent to those skilled in the art without departing from the spirit and scope of the invention.

I claim:

1. The method of reheating and controlling the movement of elongated steel bars having ends wherein the bars are formed by an axial movement casting process causing the bars to cool from a previously heated condition such that the bar temperature varies throughout the bar axial length intermediate said ends and the bars are transported by conveyors from a caster to a plurality of treatment stations, comprising the steps of placing the bars upon a first conveyor at random, non-periodic intervals for axial movement thereon, axially translating the bars through a heated zone of lesser length in the axial direction of the bars than the bar's length at a rate of axial translation proportional to the temperature of that portion of a bar within the heated zone whereby the heat content of the bar exiting the heated zone is substantially uniform throughout the bar length, conveying the heated bar to storage means, storing the heated bars in the storage means, and removing the bars from the storage means at predetermined intervals by a second conveyor for processing at the treatment stations.

2. The method of reheating and controlling the movement of elongated steel bars as in claim 1 wherein said storage step comprises storing the steel bars in a furnace.

3. A furnace for metal bars and the like comprising, it combination, a thermally insulated housing having a floor, a top panel, spaced lateral walls and end walls defining a heated chamber, first and second bar conveyors located within said furnace spaced from each other and adapted to axially convey elongated bars in spaced, substantially parallel paths, bar supporting and storing means within said furnace comprising skids intermediate said conveyors receiving bars from said first conveyor, unloading means within said furnace transfering bars from said first conveyor onto said supporting and storing means, said unloading means comprising pivoted bar lifting means movable between a raised position lifting a bar from said first conveyor onto said bar supporting and storing means and a retracted position below said first conveyor, first expansible motor means operatively connected to said unloading means for movement thereof between said positions, loading means within said furnace adjacent said supporting and storing means and said second conveyor loading said bars on said second conveyor from said storage means, said loading means comprising a plurality of pivotally mounted arms movable between an inoperative retracted position, a lower position and an elevated position, said arms removing a bar from said bar supporting and storing means and raising said bar to said second conveyor upon moving from said lower position to said elevated position, and second expansible motor means operatively connected to said arms for selectively translating said arms between said retracted, lower and elevated positions.

4. A furnace for metal bars and the like as in claim 4 wherein said bar supporting and storing means comprises a plurality of elongated skids within said furnace extending between said conveyors having a raised upper end adjacent said first conveyor and a lower end adjacent said second conveyor whereby bars deposited on said skids by said unloading means move by gravity on said skids toward said loading means.

5. A furnace for metal bars and the like as in claim 3, wherein said loading means includes an arm pivot support mounted adjacent said furnace exteriorly thereof associated with each arm, said support including an elongated slot extending toward said bar support and storing means, a pivot defined on each arm slidably received within said slot movable in forward and rearward directions, an abutment defined in said slot engaging said pivot limiting forward movement of said pivot in said slot, said second motor means comprising an expansible motor having a piston rod pivotally connected to said arm at a point below said pivot whereby extension of said piston rod translates said arm and pivot in said forward direction moving said arm from said retracted position to said lower position and upon engagement of said pivot with said abutment said arm pivots from said lower position to said elevated position, retracting of said piston rod sequentially lowering said arm from said elevated position to said lower position and moving said pivot in said rearward direction moving said arm from said lower position to said retracted position.

6. A furnace for metal bars and the like as in claim 5 wherein said slot abutment comprises a slot end, said arm pivot support comprising a yoke member having spaced yoke wall portions, the associated arm being located between said yoke wall portions and slots being defined in both yoke wall portions.

* * * * *